(12) United States Patent
Kamaleddine

(10) Patent No.: US 11,666,033 B2
(45) Date of Patent: Jun. 6, 2023

(54) ANIMAL FEEDING ASSEMBLY

(71) Applicant: Fadi Kamaleddine, Airdrie (CA)

(72) Inventor: Fadi Kamaleddine, Airdrie (CA)

( * ) Notice: Subject to any disclaimer, the term of this patent is extended or adjusted under 35 U.S.C. 154(b) by 107 days.

(21) Appl. No.: 17/318,340

(22) Filed: May 12, 2021

(65) Prior Publication Data

US 2022/0361443 A1 Nov. 17, 2022

(51) Int. Cl.
*A01K 5/01* (2006.01)

(52) U.S. Cl.
CPC ................................. *A01K 5/0114* (2013.01)

(58) Field of Classification Search
CPC ...... A01K 5/01; A01K 5/0114; A01K 5/0121; A01K 5/0135; A01K 5/0142
See application file for complete search history.

(56) References Cited

U.S. PATENT DOCUMENTS

| | | | |
|---|---|---|---|
| 2,845,896 A | 8/1958 | Copeland | |
| 4,029,051 A | 6/1977 | McKiey | |
| 4,044,723 A * | 8/1977 | Fitzpatrick | ........... A01K 5/0114 119/61.5 |
| 4,753,195 A * | 6/1988 | Maggio | ................. A01K 39/01 119/52.2 |
| 5,133,291 A | 7/1992 | Justice | |
| 5,884,582 A | 3/1999 | Duckworth | |
| 6,588,367 B1 | 7/2003 | MacManus | |
| 6,915,761 B1 * | 7/2005 | Campbell | .............. A01K 7/027 119/61.5 |
| 8,578,883 B2 | 11/2013 | Pfingsten | |
| D739,614 S | 9/2015 | Ausman | |
| 9,288,967 B1 * | 3/2016 | Wampler | ................. A01K 7/00 |
| 2009/0001231 A1 * | 1/2009 | Casanova | ............ A01K 5/0114 119/61.5 |
| 2019/0075898 A1 * | 3/2019 | Friedgood | ............ A45C 13/005 |

FOREIGN PATENT DOCUMENTS

WO WO9216102 10/1992

* cited by examiner

*Primary Examiner* — Ebony E Evans

(57) ABSTRACT

An animal feeding assembly includes a tunnel has an upper wall and a first dish opening is integrated into the upper wall. A first dish is insertable into the first dish opening to facilitate a large animal to feed from the first dish. A tray is insertable into the tunnel and a second dish opening is integrated into the tray. A second dish is insertable into the second dish opening when the tray is inserted into the tunnel to inhibit the large animal from feeding from the second dish and to facilitate a small animal to feed from the second dish. A first spacer is positionable beneath the tunnel for increasing a height of the tunnel. A second spacer is positionable beneath the first spacer for increasing a height of the tunnel.

8 Claims, 5 Drawing Sheets

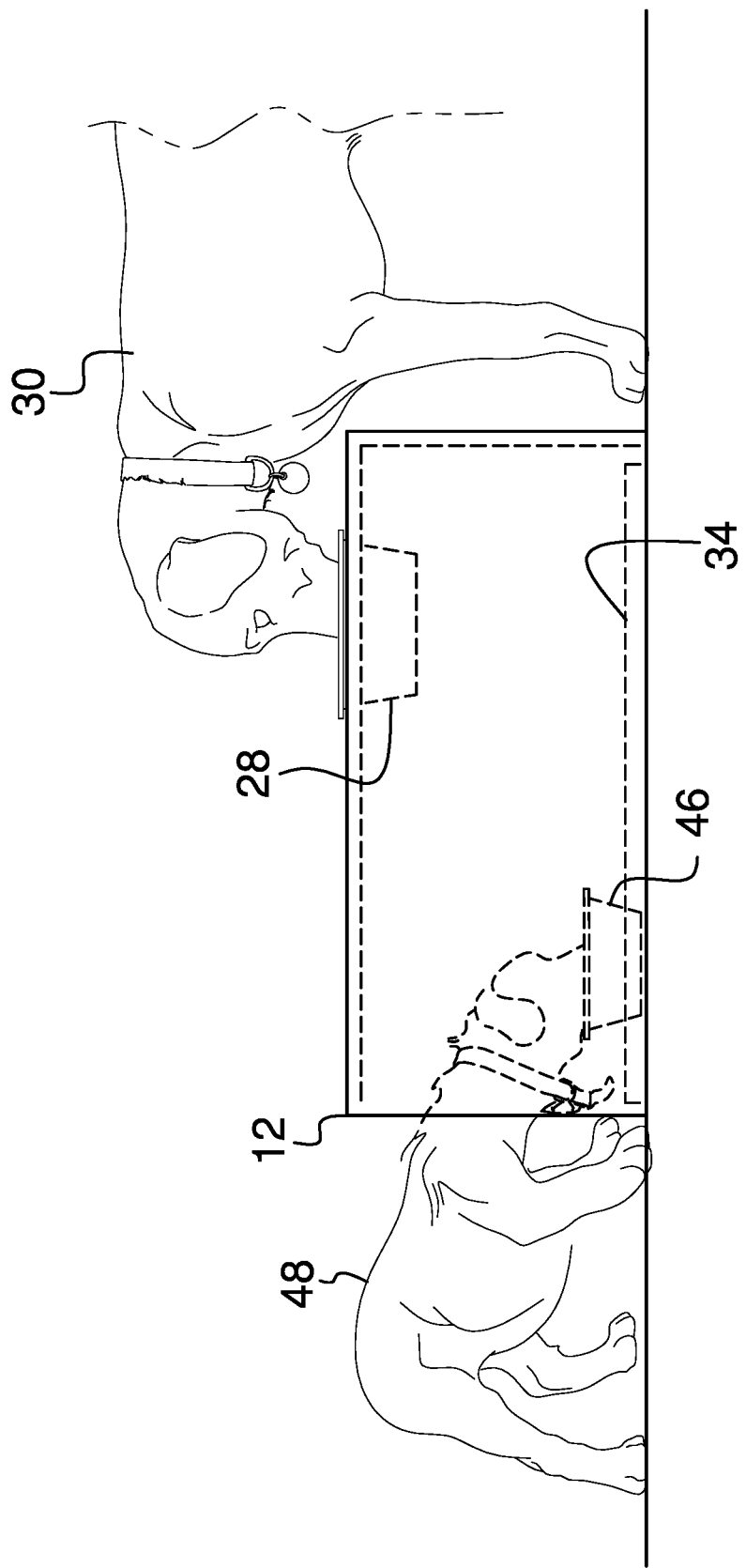

ANIMAL FEEDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to feeding devices and more particularly pertains to a new feeding device for simultaneously feeding a large animal and a small animal. The device includes a tunnel which supports a first feeding dish for feeding the large animal. A tray is slidable into the tunnel and a second feeding dish is positionable on the tray for feeding a small animal.

(2) Description of Related Art Including Information Disclosed Under 37 CFR 1.97 and 1.98

The prior art relates to feeding devices including a variety of feeding tunnels that have an entry and a feeding dish positioned in the tunnel for protecting an animal during feeding. The prior art discloses a variety of feeding enclosures that include a pair of feeding dishes for feeding a pair of animals. In each instance the pair of feeding dishes is supported on a common surface. In no instance does the prior art disclose a tunnel for supporting a first dish and enclosing a second dish having the first dish and the second dish at different heights.

BRIEF SUMMARY OF THE INVENTION

An embodiment of the disclosure meets the needs presented above by generally comprising a tunnel has an upper wall and a first dish opening is integrated into the upper wall. A first dish is insertable into the first dish opening to facilitate a large animal to feed from the first dish. A tray is insertable into the tunnel and a second dish opening is integrated into the tray. A second dish is insertable into the second dish opening when the tray is inserted into the tunnel to inhibit the large animal from feeding from the second dish and to facilitate a small animal to feed from the second dish. A first spacer is positionable beneath the tunnel for increasing a height of the tunnel. A second spacer is positionable beneath the first spacer for increasing a height of the tunnel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is a perspective in-use view of an embodiment of the disclosure.

DETAILED DESCRIPTION OF THE INVENTION

Figure 1:
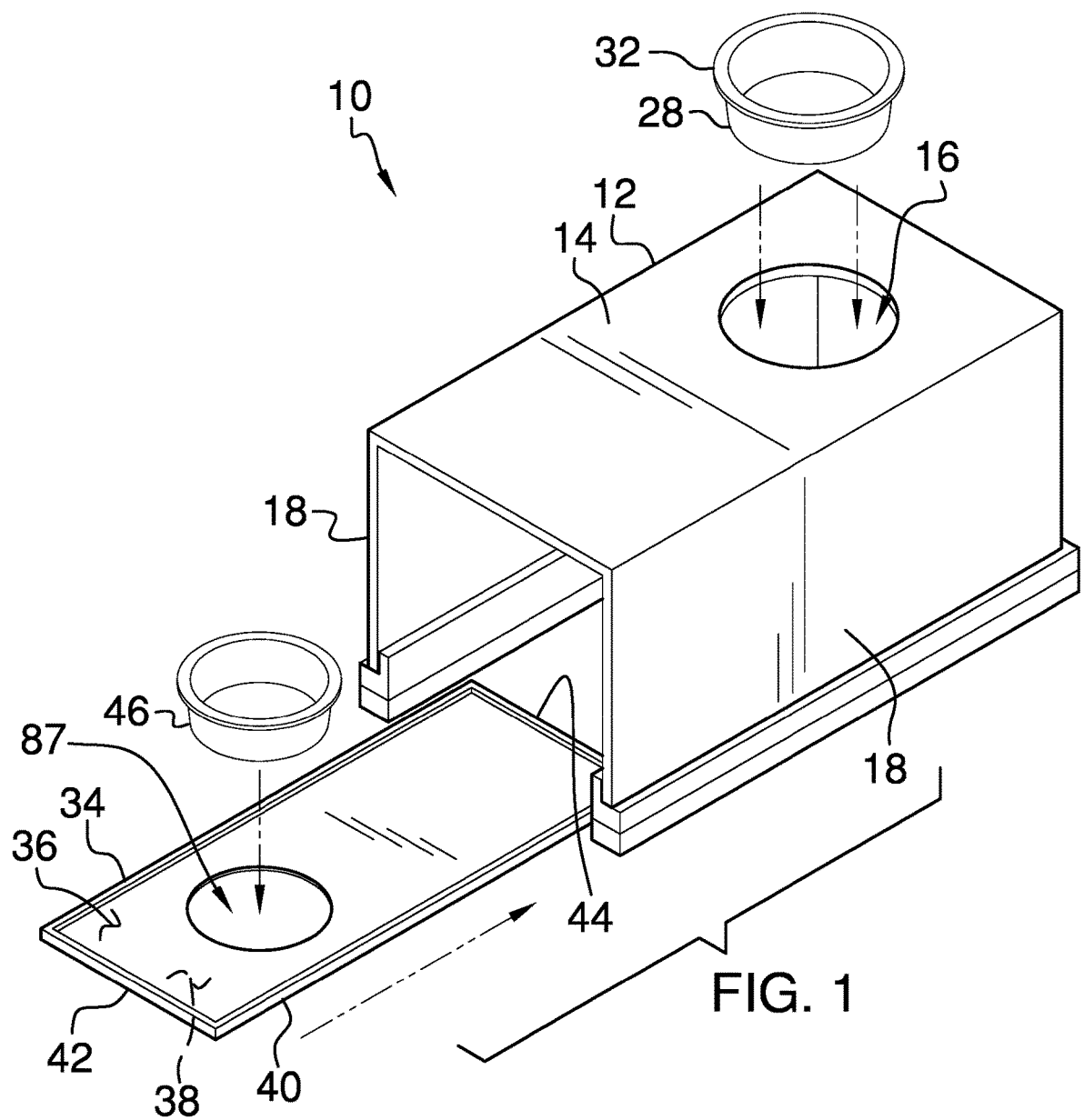
FIG. 1 is an exploded front perspective view of an animal feeding assembly according to an embodiment of the disclosure.
Figure 2:
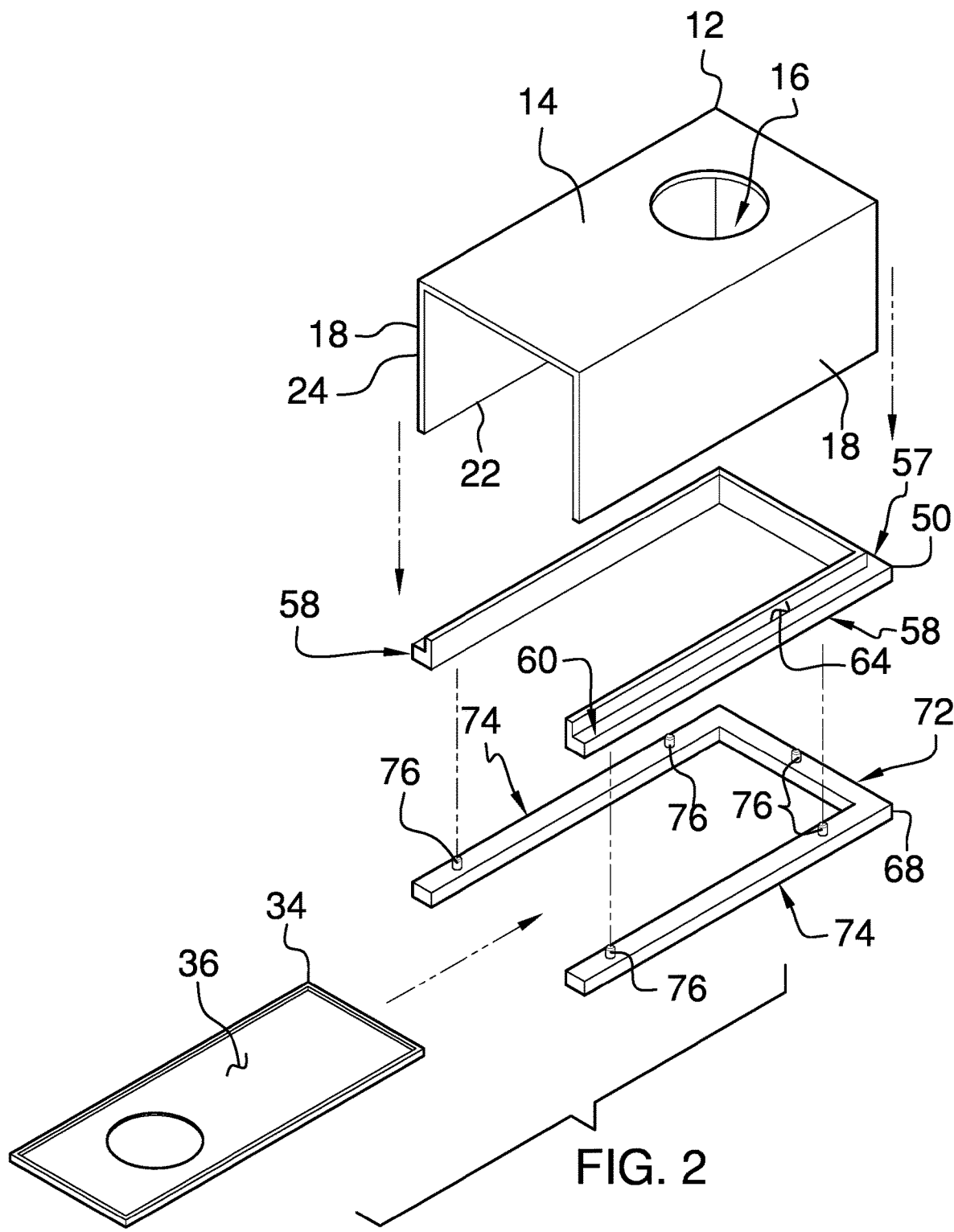
FIG. 2 is an exploded top perspective view of an embodiment of the disclosure.
Figure 3:
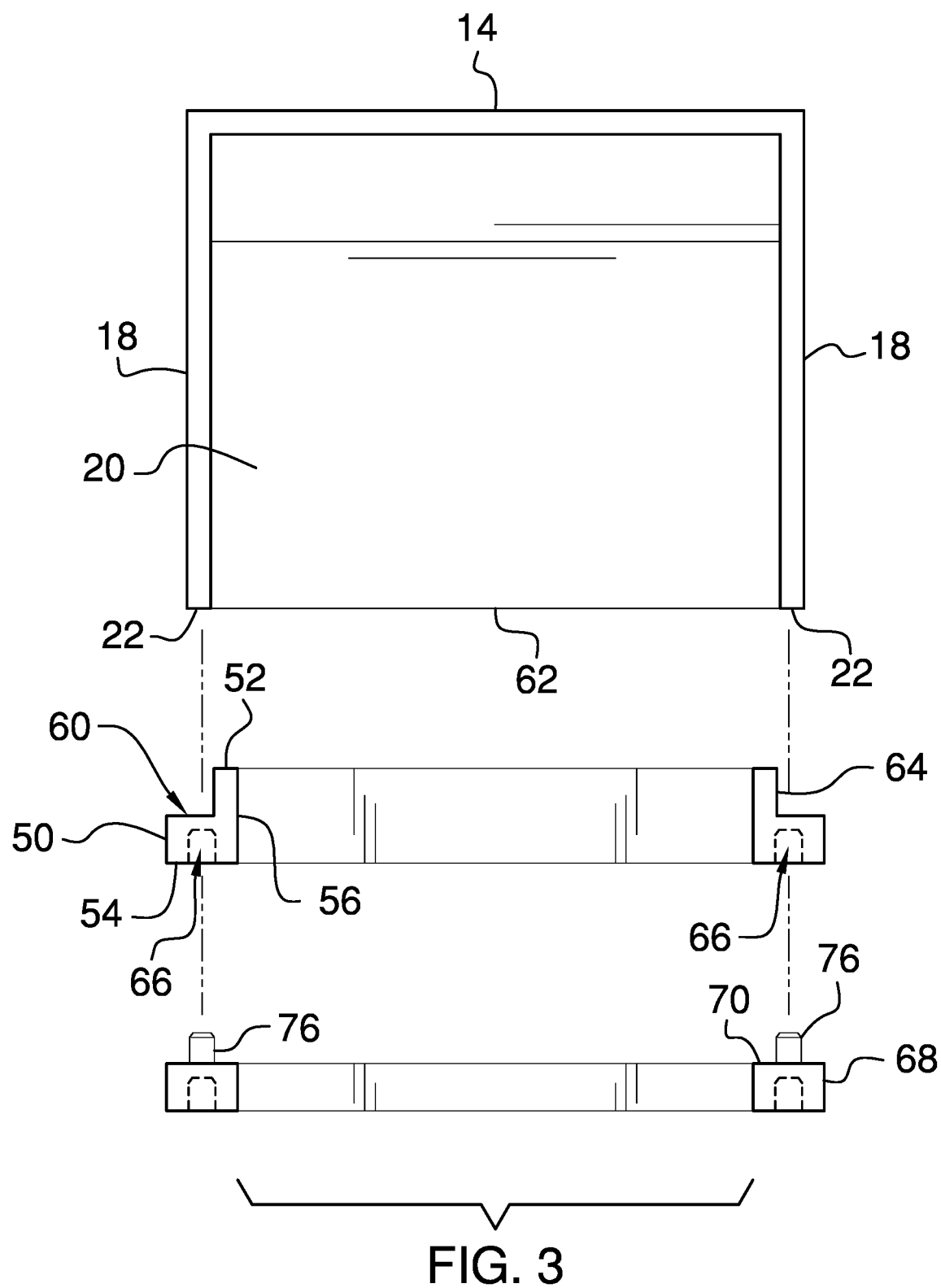
FIG. 3 is a front exploded view of an embodiment of the disclosure.
Figure 4:
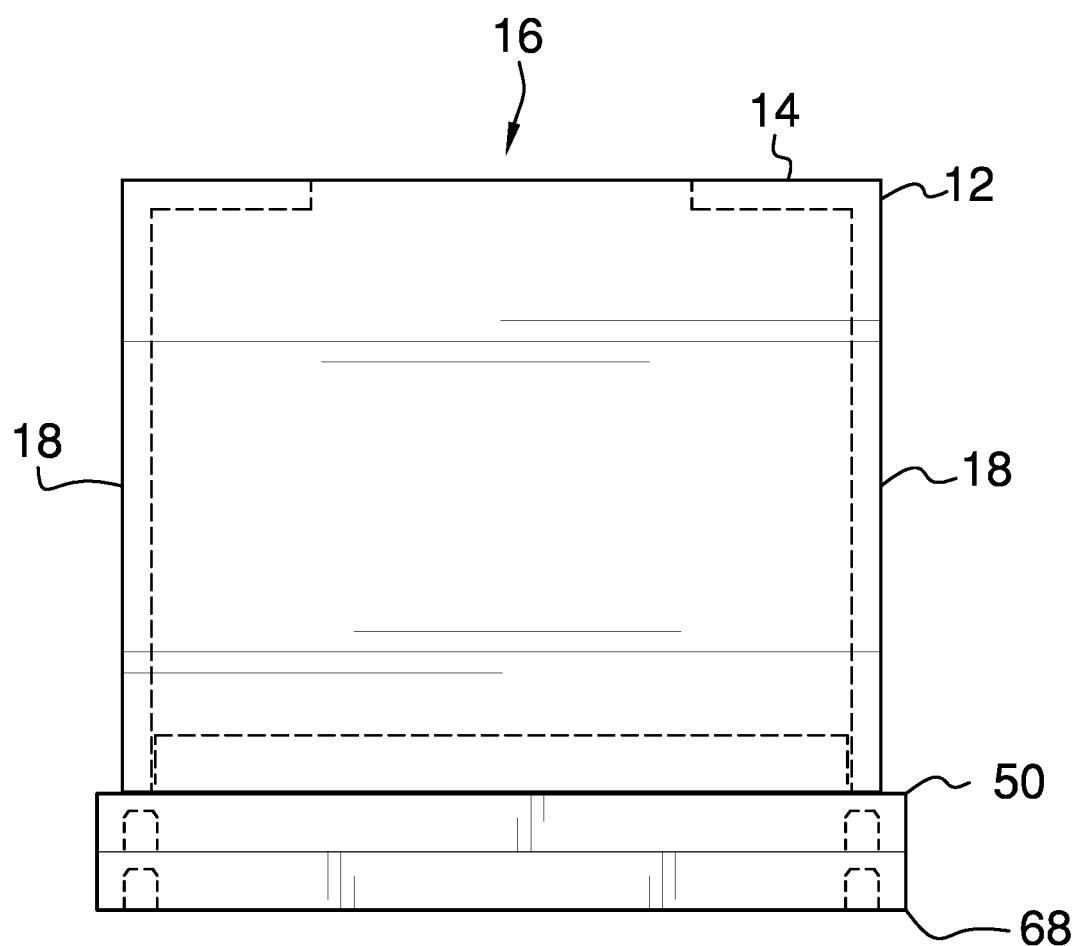
FIG. 4 is a back phantom view of an embodiment of the disclosure.

With reference now to the drawings, and in particular to FIGS. 1 through 5 thereof, a new feeding device embodying the principles and concepts of an embodiment of the disclosure and generally designated by the reference numeral 10 will be described.

As best illustrated in FIGS. 1 through 5, the animal feeding assembly 10 generally comprises a tunnel 12 that has an upper wall 14 and a first dish opening 16 that is integrated into the upper wall 14. The tunnel 12 has a pair of outer walls 18 each extending downwardly from the upper wall 14, and the tunnel 12 has a rear wall 20 extending between each of the outer walls 18. Each of the outer walls 18 has a bottom edge 22 and a forward edge 24, and the forward edge 24 of each of the outer walls 18 defines an opening 26 into the tunnel 12. The first dish opening 16 is positioned adjacent to the rear wall 20 and the tunnel 12 is elongated between the rear wall 20 and the forward edge 24 of the outer walls 18.

A first dish 28 is provided and the animal feed can be positioned in the first dish 28. The first dish 28 is insertable into the first dish opening 16 such that the first dish 28 is elevated to facilitate a large animal 30 to feed from the first dish 28. The large animal 30 may be a large breed canine, such as a German Shepherd, a Golden Retriever or other similarly sized animal. The first dish 28 has a lip 32 extending outwardly from the first dish 28 and the lip 32 rests upon the upper wall 14 of the tunnel 12 when the first dish 28 is inserted into the first dish opening 16.

A tray 34 is insertable into the tunnel 12 and a second dish opening 87 is integrated into the tray 34. The tray 34 has a top surface 36, a bottom surface 38 and a perimeter edge 40 extending between the top surface 36 and the bottom surface 38. The perimeter edge 40 has a front side 42 and a back side 44, and the tray 34 is elongated between the front side 42 and the back side 44. The second dish opening 87 extends through the top surface 36 and the bottom surface 38, and the second dish opening 87 is positioned adjacent to the front side 42. Moreover, the front side 42 is aligned with the forward edge 24 of the outer walls 18 of the tunnel 12 when the tray 34 is inserted into the tunnel 12.

A second dish 46 is provided for containing animal feed and the second dish 46 is insertable into the second dish opening 87 when the tray 34 is inserted into the tunnel 12. In this way the second dish 46 is concealed to inhibit the large animal 30 from feeding from the second dish 46. Additionally, a small animal 48, which could be small breed canine such as a Chihuahua or other similarly sized animal, can feed from the second dish 46.

A first spacer 50 is positionable beneath the tunnel 12 for increasing a height of the tunnel 12. The first spacer 50 has an upper surface 52, a lower surface 54 and an inwardly facing surface 56 extending between the upper surface 52 and the lower surface 54. Additionally, the first spacer 50 has a middle portion 57 extending between a pair of outward portions 58. The upper surface 52 has a groove 60 extending toward the lower surface 54, and the groove 60 extends along each of the outward portions 58 and the middle portion 57. The groove 60 in each of the outward portions 58 receives the bottom edge 22 of a respective one of the outer walls 18 of the tunnel 12, and the groove 60 in the middle portion 57 receives a lower edge 62 of the rear wall 20 of the tunnel 12.

The groove 60 is spaced from the inwardly facing surface 56 of the first spacer 50 to define a rear bounding surface 64 of the groove 60. Additionally, the tunnel 12 abuts the rear bounding surface 64 of the groove 60 when the tunnel 12 is positioned on the first spacer 50 thereby inhibiting the tunnel 12 from sliding off of the tunnel 12. The lower surface 54 has a plurality of wells 66 each extending toward the upper surface 52, and the wells 66 are spaced apart from each other and are distributed around the first spacer 50. The first spacer 50 may have a height ranging between approximately 1.0 inch and 2.0 inches.

A second spacer 68 is positionable beneath the first spacer 50 for increasing a height of the tunnel 12. The second spacer 68 has a topmost surface 70 and the second spacer 68 has a central portion 72 extending between a pair of outside portions 74. The middle portion 57 of the first spacer 50 rests on the central portion 72 and each of the outward portions 58 of the first spacer 50 rests on a respective one of the outside portions 74. Additionally, the second spacer 68 may have a height ranging between approximately 1.0 inches and 2.0 inches. A plurality of pegs 76 is each coupled to and extends upwardly from the topmost surface 70 of the second spacer 68. Each of the pegs 76 engages a respective one of the wells 66 in the lower surface 54 of the first spacer 50 for attaching the second spacer 68 to the first spacer 50.

In use, the first dish 28 is placed in the first dish opening 16, the tray 34 is slid into the tunnel 12 and the second dish 46 is placed in the second dish opening 87. In this way the large animal 30 approaches the tunnel 12 from the rear to eat from the first dish 28. Additionally, the small animal 48 partially enters the tunnel 12 from the front to eat from the second dish 46. In this way the large animal 30 and the small animal 48 can simultaneously feed while being sequestered from each other. The first spacer 50 and the second spacer 68 can be positioned beneath the tunnel 12 in order to create sufficient height for the small animal 48.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An animal feeding assembly for facilitating a small animal and a large animal to feed simultaneously, said assembly comprising:
   a tunnel having an upper wall, said upper wall having a first dish opening being integrated into said upper wall;
   a first dish being configured to have animal feed positioned therein, said first dish being insertable into said first dish opening wherein said first dish is configured to be elevated to facilitate a large animal to feed from said first dish;
   a tray being insertable into said tunnel, said tray having a second dish opening being integrated into said tray;
   a second dish being configured to contain animal feed, said second dish being insertable into said second dish opening when said tray is inserted into said tunnel wherein said second dish is configured to be concealed to inhibit the large animal from feeding from said second dish and to facilitate a small animal to feed from said second dish;
   a first spacer being positionable beneath said tunnel for increasing a height of said tunnel; and
   a second spacer being positionable beneath said first spacer for increasing a height of said tunnel.

2. The assembly according to claim 1, wherein said tunnel has a pair of outer walls each extending downwardly from said upper wall, said tunnel having a rear wall extending between each of said outer walls, each of said outer walls having a bottom edge and a forward edge, said forward edge of each of said outer walls defining an opening into said tunnel, said first dish opening being positioned adjacent to said rear wall, said tunnel being elongated between said rear wall and said forward edge of said outer walls.

3. The assembly according to claim 2, wherein said tray has a top surface, a bottom surface and a perimeter edge extending between said top surface and said bottom surface, said perimeter edge having a front side and a back side, said tray being elongated between said front side and said back side, said second dish opening extending through said top surface and said bottom surface, said second dish opening being positioned adjacent to said front side, said front side being aligned with said forward edge of said outer walls of said tunnel when said tray is inserted into said tunnel.

4. The assembly according to claim 2, wherein said first spacer has an upper surface, a lower surface and an inwardly facing surface extending between said upper surface and said lower surface, said first spacer having a middle portion extending between a pair of outward portions, said upper surface having a groove extending toward said lower surface, said groove extending along each of said outward portions and said middle portion, said groove in each of said outward portions receiving said bottom edge of a respective one of said outer walls of said tunnel, said groove in said middle portion receiving a lower edge of said rear wall of said tunnel.

5. The assembly according to claim 4, wherein said groove is spaced from said inwardly facing surface of said first spacer to define a rear bounding surface of said groove, said tunnel abutting said rear bounding surface of said groove when said tunnel is positioned on said first spacer thereby inhibiting said tunnel from sliding off of said tunnel.

6. The assembly according to claim 4, wherein said lower surface has a plurality of wells each extending toward said upper surface, said wells being spaced apart from each other and being distributed around said first space.

7. The assembly according to claim 6, wherein:
said second spacer has a topmost surface, said second spacer having a central portion extending between a pair of outside portions, said middle portion of said first spacer resting on said central portion, each of said outward portions of said first spacer resting on a respective one of said outside portions; and
said assembly includes a plurality of pegs, each of said pegs being coupled to and extending upwardly from said topmost surface of said second spacer, each of said pegs engaging a respective one of said wells in said lower surface of said first spacer for attaching said second spacer to said first spacer.

8. An animal feeding assembly for facilitating a small animal and a large animal to feed simultaneously, said assembly comprising:
a tunnel having an upper wall, said upper wall having first dish opening being integrated into said upper wall, said tunnel having a pair of outer walls each extending downwardly from said upper wall, said tunnel having a rear wall extending between each of said outer walls, each of said outer walls having a bottom edge and a forward edge, said forward edge of each of said outer walls defining an opening into said tunnel, said first dish opening being positioned adjacent to said rear wall, said tunnel being elongated between said rear wall and said forward edge of said outer walls;
a first dish being configured to have animal feed positioned therein, said first dish being insertable into said first dish opening wherein said first dish is configured to be elevated to facilitate a large animal to feed from said first dish, said first dish having a lip extending outwardly from said first dish, said lip resting upon said upper wall of said tunnel when said first dish is inserted into said first dish opening;
a tray being insertable into said tunnel, said tray having a second dish opening being integrated into said tray, said tray having a top surface, a bottom surface and a perimeter edge extending between said top surface and said bottom surface, said perimeter edge having a front side and a back side, said tray being elongated between said front side and said back side, said second dish opening extending through said top surface and said bottom surface, said second dish opening being positioned adjacent to said front side, said front side being aligned with said forward edge of said outer walls of said tunnel when said tray is inserted into said tunnel;
a second dish being configured to contain animal feed, said second dish being insertable into said second dish opening when said tray is inserted into said tunnel wherein said second dish is configured to be concealed to inhibit the large animal from feeding from said second dish and to facilitate a small animal to teed from said second dish:
a first spacer being positionable beneath said tunnel for increasing a height of said tunnel, said first spacer having an upper surface, a lower surface and an inwardly facing surface extending between said upper surface and said lower surface, said first spacer having a middle portion extending between a pair of outward portions, said upper surface having a groove extending toward said lower surface, said groove extending along each of said outward portions and said middle portion, said groove in each of said outward portions receiving said bottom edge of a respective one of said outer walls of said tunnel, said groove in said middle portion receiving a lower edge of said rear wall of said tunnel, said groove being spaced from said inwardly facing surface of said first spacer to define a rear bounding surface of said groove, said tunnel abutting said rear bounding surface of said groove when said tunnel is positioned on said first spacer thereby inhibiting said tunnel from sliding off of said tunnel, said lower surface having a plurality of wells each extending toward said upper surface, said wells being spaced apart from each other and being distributed around said first space;
a second spacer being positionable beneath said first spacer for increasing a height of said tunnel, said second spacer having a topmost surface, said second spacer having a central portion extending between a pair of outside portions, said middle portion of said first spacer resting on said central portion, each of said outward portions of said first spacer resting on a respective one of said outside portions; and
a plurality of pegs, each of said pegs being coupled to and extending upwardly from said topmost surface of said second spacer, each of said pegs engaging a respective one of said wells in said lower surface of said first spacer for attaching said second spacer to said first spacer.

* * * * *